(12) United States Patent
Han et al.

(10) Patent No.: US 8,134,781 B2
(45) Date of Patent: Mar. 13, 2012

(54) OPTICAL FILM AND MANUFACTURING PROCESS THEREOF

(75) Inventors: Sang-Choll Han, Daejeon (KR); Kwang-Seung Park, Daejeon (KR); Kyung-Mo Kim, Daejeon (KR); Won-Young Jo, Seoul (KR); Jin-Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/866,201

(22) PCT Filed: Mar. 3, 2009

(86) PCT No.: PCT/KR2009/001048
§ 371 (c)(1),
(2), (4) Date: Aug. 4, 2010

(87) PCT Pub. No.: WO2009/110736
PCT Pub. Date: Sep. 11, 2009

(65) Prior Publication Data
US 2010/0321787 A1    Dec. 23, 2010

(30) Foreign Application Priority Data

Mar. 3, 2008  (KR) .................. 10-2008-0019811
Mar. 3, 2009  (KR) .................. 10-2009-0018176

(51) Int. Cl.
*G02B 27/10*    (2006.01)
*F21V 3/00*     (2006.01)

(52) U.S. Cl. ........ 359/619; 359/566; 359/454; 359/456; 362/311.06; 264/2.5

(58) Field of Classification Search .................. 359/619, 359/621–626, 456, 457, 569, 571; 362/97.1, 362/311.06, 317, 339, 340; 428/156, 167, 428/168
See application file for complete search history.

(56) References Cited

U.S. PATENT DOCUMENTS

| | | | |
|---|---|---|---|
| 4,345,308 A * | 8/1982 | Mouyard et al. | 362/332 |
| 4,911,529 A * | 3/1990 | Van De Ven | 359/454 |
| 6,124,975 A * | 9/2000 | Dona et al. | 359/626 |
| 6,130,777 A * | 10/2000 | Yamashita et al. | 359/456 |
| 6,798,574 B2 | 9/2004 | Kim | |
| 7,985,358 B2 * | 7/2011 | Han et al. | 264/2.5 |
| 2007/0253064 A1 | 11/2007 | Ookubo et al. | |
| 2009/0147179 A1 | 6/2009 | Yamashita et al. | |
| 2010/0097705 A1 | 4/2010 | Furui et al. | |
| 2010/0276844 A1 * | 11/2010 | Han et al. | 264/400 |
| 2011/0044058 A1 * | 2/2011 | Shim et al. | 362/311.06 |

FOREIGN PATENT DOCUMENTS

KR    10-2002-0061802 A    7/2002
(Continued)

*Primary Examiner* — Loha Ben
(74) *Attorney, Agent, or Firm* — McKenna Long & Aldridge LLP

(57) ABSTRACT

There is provided an optical film for backlight units or illuminators. The optical film comprises a light-incident portion and a light exit portion. Here, the optical film is characterized in that it comprises a plurality of protrusions formed on at least one of the light-incident portion and the light exit portion, wherein a plurality of the protrusions satisfies the requirements of the following Equation: $80 \times H^{1/3} \leq P \leq 200 \times H^{1/3}$ and $0.1 \times D \leq H \leq D$, provided that a mean diameter of protrusions is represented by 'D', a mean height of protrusions is represented by 'H', and a mean distance between adjacent protrusions is represented by 'P'. Therefore, the optical film may be useful to suppress blocking between films and the formation of surface defects, which are caused by the Moire, Newton ring and wet-out phenomena, without degrading the brightness.

14 Claims, 8 Drawing Sheets

FOREIGN PATENT DOCUMENTS

| | | |
|---|---|---|
| KR | 10-0697613 B1 | 3/2007 |
| KR | 10-0759690 B1 | 9/2007 |
| KR | 10-2008-0016319 A | 2/2008 |
| KR | 10-2008-0019803 A | 3/2008 |
| WO | WO 95/31737 A1 | 11/1995 |
| WO | WO 2008/020612 A1 | 2/2008 |

* cited by examiner

A    B

OPTICAL FILM AND MANUFACTURING PROCESS THEREOF

This application is a 35 U.S.C. §371 National Stage entry of International Application No. PCT/KR2009/001048, filed on Mar. 3, 2009, and claims priority to Korean Application No. 10-2008-0019811, filed on Mar. 3, 2008 and Korean Application No. 10-2009-0018176, filed on Mar. 3, 2009, which are all hereby incorporated by reference in their entireties.

TECHNICAL FIELD

The present invention relates to an optical film for backlight units or illuminators and a manufacturing process thereof, and more particularly, to an optical film comprising a plurality of protrusions that is formed on one or both sides thereof and satisfy certain requirements and a manufacturing process thereof.

BACKGROUND ART

As one of the fields to which the present invention is applicable, a liquid crystal display (LCD) is a device that generally displays an image by injecting a liquid crystal material between an upper substrate and a lower substrate, changing orientations of liquid crystal molecules by applying different electric potentials to pixel electrodes and common electrodes to form an electric field, and adjusting the transmissivity of light according to the orientations of the liquid crystal molecules, wherein the upper substrate has common electrodes, color filters and the like formed therein, and the lower substrate has thin film transistors, pixel electrodes and the like formed therein.

Since a liquid crystal display panel is a passive element that does not voluntarily emit light, a backlight unit is necessarily installed in the liquid crystal display panel to supply light. In general, the backlight unit includes a light source supplying light; a diffuser plate or a light guide plate converting a line light source or a point light source into a surface light source; and a variety of optical films used to improve optical performances.

The optical films used in the backlight unit includes a collimating film used to improve brightness, a diffusing film having an effect to shield defects of the backlight rear or bright lines of the light source, etc.

Meanwhile, the collimating film has a lens structure arranged periodically to deflect a light path at one surface thereof. A generally used lens structure includes a prismatic lens, a semi-cylindrical lenticular lens, micro lens array, a Fresnel lens, etc.

These lens structures have functions to collimate light emitted from a light source towards the front of a display to improve brightness. However, the collimating films having these lens structures have problems regarding the Moire phenomenon emerging from the periodicity, the wet-out phenomenon caused by the lack of gap, the Newton ring phenomenon of contour patterns due to the changes in air gap between two adjacent films, and also has a disadvantage in that surface defects occurs on a screen due to the above-mentioned phenomena.

Therefore, in order to solve the above problems, there have been attempts to relieve the regularity of a lens structure such as prism or lenticular lens. As one representative example, there has been proposed a method for relieving the regularity of a lens structure by forming a shape of a lens structure in a mold using bite processing, throwing beads having a size of several micrometers to several tens micrometers to the mold, and sanding the lens structures to form a random secondary structure on the lens structure formed in the mold.

However, this method has problems in that it is difficult to expect a position where a secondary structure is formed due to the difficulty in controlling a position where beads are thrown, and optical performances are deteriorated since beads are hardly thrown to a concave surface of the mold due to the air turbulence, but sanded mainly on a convex surface of the mold. Also, the reliability of products is degraded since the reproducibility is not maintained at every sanding process. Furthermore, optical films prepared in these methods show somewhat improved Moire or Newton ring phenomena, but have problems in that a collimating effect of the lens structures is deteriorated and the haze is increased due to the random formation of secondary structures.

Meanwhile, backlight units including a film-laminate which is prepared by stacking a plurality of films such as a collimating film, a diffusing film, a protective film and etc., have been recently used. These backlight units have problems in that surface defects are induced as the stacked films adhere (block) to each other.

DISCLOSURE OF INVENTION

Technical Problem

The present invention is designed to solve the problems of the prior art, and therefore it is an object of the present invention to provide an optical film capable of showing excellent performances of preventing blocking between films and enormously suppressing the formation of surface defects, which are caused by the Moire, Newton ring and wet-out phenomena, without degrading the brightness of the optical film. It is another object of the present invention to provide a process for manufacturing the optical film.

Technical Solution

According to an aspect of the present invention, there is provided an optical film comprising a light-incident portion and a light exit portion, comprising a plurality of protrusions formed on at least one of the light-incident portion and the light exit portion, wherein a plurality of the protrusions satisfies the requirements of the following Expressions: $80 \times H^{1/3} \leq P \leq 200 \times H^{1/3}$ and $0.1 \times D \leq H \leq D$, provided that a mean diameter of protrusions is represented by 'D', a mean height of protrusions is represented by 'H', and a mean distance between adjacent protrusions is represented by 'P'.

In this case, each of a plurality of the protrusions may have a mean height of 1 to 30 μm, preferably, 4.5 to 7 μm, and a mean distance between the adjacent protrusions may be in a range of 100 to 600 μm, preferably, 150 to 300 μm.

Also, the sum of areas where a plurality of the protrusions is formed accounts for 0.5% to 5% of the entire area of one surface of the optical film.

In addition, a plurality of the protrusions may be formed through laser etching.

Additionally, the optical film according to one exemplary embodiment of the present invention may further comprise a plurality of lens-shaped convex portions. In this case, each of the convex portions may be formed through bead sanding or laser etching.

Also, the light exit portion may be composed of a plurality of lens structures to collimate or spread light, and a plurality of the protrusions may be formed on the lens structures. In this case, each of the lens structures may be one selected from the group consisting of a lenticular lens, a prism lens, a micro lens array and a Fresnel lens.

Also, the optical film may further comprise a plurality of lens-shaped convex portions, and the convex portions may be formed in valley regions of the lens structures.

According to another aspect of the present invention, there is provided a process for manufacturing an optical film. Here, the process comprises: etching shapes of protrusions in at least one of a first mold and a second mold by using a laser beam, the first mold engraved with a shape of light-incident portion and the second mold engraved with a shape of light exit portion; and injecting a curable resin between the first mold and the second mold and curing the curable resin.

In this case, the shapes of the protrusions may be made so that they can satisfy the requirements of the following Expressions: $80 \times H^{1/3} \leq P \leq 200 \times H^{1/3}$ and $0.1 \times D \leq H \leq D$, provided that a mean diameter of protrusions is represented by 'D', a mean height of protrusions is represented by 'H', and a mean distance between adjacent protrusions is represented by 'P'.

Also, in the operation of etching shapes of protrusions, an initial phase of laser beam may be changed along a transverse direction of the optical film.

In addition, the first mold and the second mold may be a flat-type mold, a caterpillar-type mold or a drum-type mold.

Additionally, prior to etching shapes of protrusions in at least one of a first mold and a second mold by using a laser beam, the process may further comprise: engraving the shapes of the convex portions. In this case, the operation of engraving the shapes of the convex portions may be carried out through bead sanding or laser etching.

Furthermore, the light exit portion may be formed in the form of a lenticular lens, a prism, a micro lens array or a Fresnel lens.

Advantageous Effects

The optical film according to one exemplary embodiment of the present invention may be useful to enormously suppress the formation of surface defects, which are caused by the Moire, wet-out and Newton ring phenomena, without degrading the brightness by forming a plurality of protrusions, which satisfies the specific requirements, on a light-incident portion or a light exit portion thereof.

Also, the optical film according to one exemplary embodiment of the present invention may be useful to prevent the blocking between films since a plurality of the protrusions act as spacers.

Additionally, the optical film according to one exemplary embodiment of the present invention may be useful to prevent the Moire performance more effectively by forming lens-shaped convex portions on the light-incident portion or the light exit portion in addition to the protrusions.

Meanwhile, the process for manufacturing an optical film according to one exemplary embodiment of the present invention may be useful to adjust a shape, an area and a depth of etching per pulse under the control of an optical system, thus to mark spots easily compared to the conventional machine/bite cutting process, since the protrusions are formed using a laser beam. Also, the process according to one exemplary embodiment of the present invention has an advantage of exactly predicting a position where protrusions are formed, unlike the process, such as bead sanding, that does not exactly predict a position where protrusions are formed.

Also, laser etching has an advantage in that, although any stereoscopic shapes are present in a processed mold, secondary shapes having a constant depth from a curved surface may be provided for a mold since the laser beam reaches the surface and then begin to etch the surface.

In addition, the laser etching has an advantage in that it is advantageous to suppress a Moire or wet-out phenomenon caused by the uniformity since shapes per pulse are not uniform in a flat surface, compared to the bite processing.

Additionally, when the laser beam is Q-switching oscillation, it has an advantage in that one pattern processing per pulse is achieved since the laser beam has a high energy per pulse, and the spot processing time is short due to the high pulse frequency (10~100 kHz), compared to the bite processing.

Furthermore, the process for manufacturing an optical film according to one exemplary embodiment of the present invention may be useful to prevent the Moire, Newton ring and wet-out phenomena, without degrading the brightness of the optical film by changing an initial phase of a laser beam along a transverse direction of the optical film so as to simultaneously realize the regularity and irregularity.

BEST MODE FOR CARRYING OUT THE INVENTION

Figure 1:
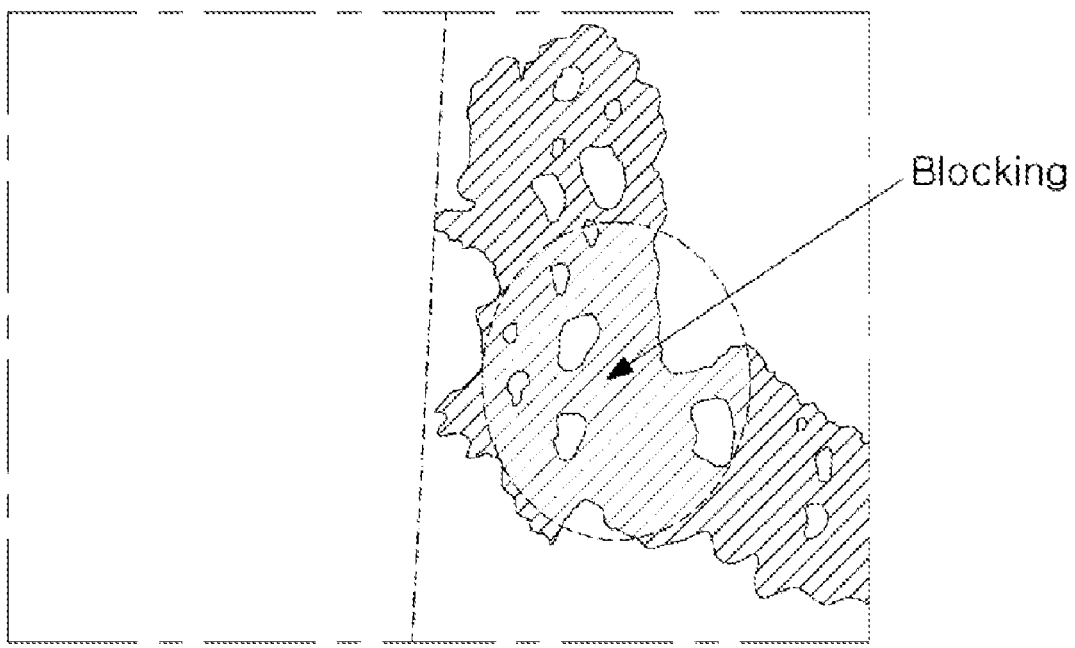
FIG. 1 is a photograph illustrating a comparison of the blocking prevention effects between the optical films according to Example 3 and Comparative example 2.

The present inventors have made ardent attempts, and found that the formation of surface defects caused by the Moire, Newton ring and wet-out phenomena and the blocking between films may be significantly reduced without degrading the brightness of the optical film by forming a plurality of protrusions, whose height and distribution (distance) are controlled, on a surface of an optical film. Therefore, the present invention was completed on the basis of the above facts.

The optical film according to one exemplary embodiments of the present invention includes a light-incident portion and a light exit portion and a plurality of protrusions is formed on at least one of the light-incident portion and the light exit portion.

In this case, the light-incident portion refers to a surface that faces toward a light source. Here, light emitted from a light source enters the light-incident portion. And the light exit portion refers to a surface opposite to the light-incident portion. Here, the light passed through the optical film is emitted out from the light exit portion. Meanwhile, the light exit portion may have a lens structure to collimate light, that is, a lens structure such as a prism, a lenticular lens, a micro lens array, a Fresnel lens, etc.

Meanwhile, in accordance with the present invention, a plurality of the protrusions may be formed on either or both the light-incident portion and the light exit portion.

For the optical film according to one exemplary embodiment of the present invention, a plurality of the protrusions are formed so that they can satisfy the requirements of the following Expressions 1 and 2.

$$80 \times H^{1/3} \leq P \leq 200 \times H^{1/3}$$ Expression 1

$$0.1 \times D \leq H \leq D$$ Expression 2 wherein, D represents a mean diameter of protrusions, H represents a mean height of protrusions, P represents a mean distance between adjacent protrusions, that is, a distance between peaks of adjacent protrusions. The unit of P, D and H is micrometer. The conditions of Expression 1 are set to ranges where the brightness of the optical film is not degraded, the surface defects caused by Moire, wet-out and Newton ring phenomena are reduced, and blocking between films is suppressed. Here, the blocking between films occurs when the mean distance P between the adjacent protrusions exceeds $200 \times H^{1/3}$. Also, when the mean distance P between the adjacent protrusions is less than $80 \times H^{1/3}$, hazes are getting serious.

Meanwhile, the conditions of Expression 2 are associated with the formability of the protrusions. When the mean height of the protrusions is less than 1/10 of the mean diameter of the protrusions, it is impossible to suppress the blocking between films, whereas when the mean height of the protrusions exceeds the mean diameter of the protrusions, it is difficult to separate resin formed the protrusions from a mold in the manufacture of an optical film, which leads to the poor formability.

The mean diameter of the protrusions is determined in consideration of the relation with the pitch of the lens structure and the like, generally may be in a range of approximately 1 to 100 μm. For example, when the pitch of the lens structure is approximately 50 μm, the mean diameter of the protrusions is preferably in a range of approximately 5 to 30 μm, and most preferably approximately 15 μm. In this case, the mean height of the protrusions is preferably in a range of approximately 1 to 30 μm, and most preferably approximately 1.5 to 15 μm. In collective consideration of the formability, optical performance and the like, the mean height of the protrusions is most preferably in a range of approximately 4.5 to 7 μm. Meanwhile, the mean distance between the adjacent protrusions is preferably in a range of approximately 100 to 600 μm, more preferably 100 to 400 μm, most preferably 150 to 300 μm.

The blocking prevention effects and haze values according to the mean height of the protrusions and the mean distance between the protrusions are listed in the following Table 1.

Protrusions are formed around peaks of lenticular lenses having a pitch of 50 μm and a height of 23 μm at conditions of height, diameter and distance as listed in Table 1, a PET film (SKC KOLON) having a thickness of 188 μm is stacked on the lenticular lens. Then, the resulting is kept at 80° C. for 48 hours under relative moisture of 95%, and measured for surface defects by the blocking between films and haze. A level of the surface defects is defined, as follows: X: surface defects formed, and ○: No surface defect. And a level of haze is also defined, as follows: Good: 10% or less, and Poor: greater than 10%.

TABLE 1

| Protrusion height H(μM) | Protrusion diameter D(μM) | Protrusion distance (μm), P | | | | | |
|---|---|---|---|---|---|---|---|
| | | 100 | 150 | 200 | 300 | 600 | 900 |
| 27 | 50 | ○/Poor | ○/Poor | ○/Poor | ○/Good | ○/Good | X/Good |
| 16 | 30 | ○/Poor | ○/Poor | ○/Poor | ○/Good | X/Good | X/Good |
| 9 | 20 | ○/Poor | ○/Poor | ○/Good | ○/Good | X/Good | X/Good |
| 5 | 15 | ○/Poor | ○/Good | ○/Good | ○/Good | X/Good | X/Good |
| 1.5 | 11 | ○/Good | ○/Good | ○/Good | X/Good | X/Good | X/Good |

As listed in Table 1, it was revealed that the optical film has excellent blocking prevention effect and haze value when the mean height H of protrusions and the mean distance P between protrusions are within the ranges satisfying the following Expression: $80 \times H^{1/3} \leq P \leq 200 \times H^{1/3}$.

Figure 2:
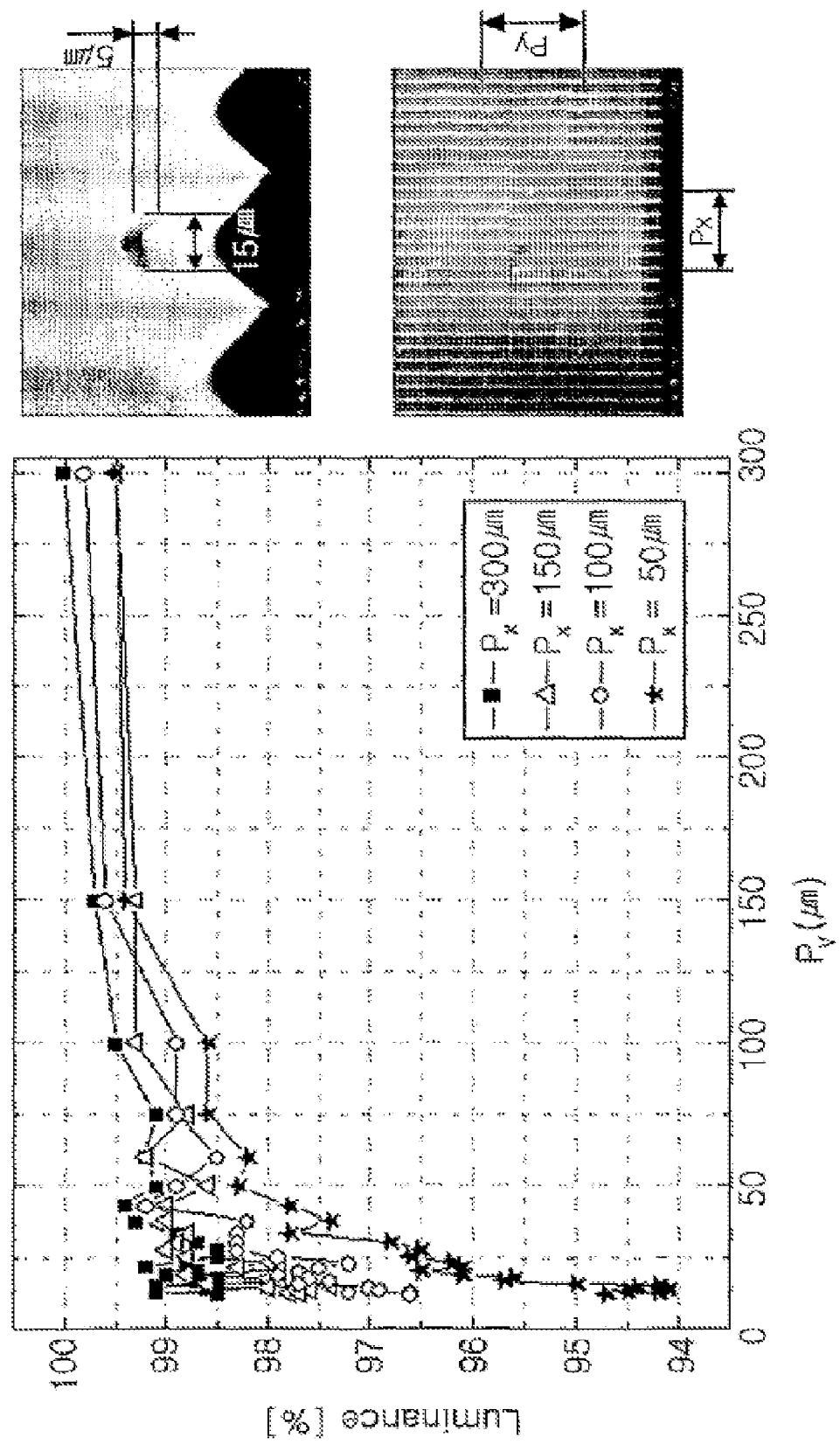
FIG. 2 is a graph illustrating the changes in brightness of an optical film according to the distribution of protrusions.

Meanwhile, FIG. 2 is a graph illustrating the changes in brightness of an optical film according to the distribution of protrusions. In FIG. 2, plotted are the brightness values of the optical film when protrusions having a diameter of 15 μm and a height of 5 μm are formed with different distances on a lenticular lens structure (pitch: 50 μm, and height: 23 μm). In FIG. 2, Px represents a protrusion distance in a transverse direction of an optical film, and Py represents a protrusion distance in a longitudinal direction of an optical film. Meanwhile, the brightness values in the graph are expressed by relative brightness values on the assumption that a brightness value of a protrusion-free lenticular lens sheet is set to 100%.

Referring to FIG. 2, it was revealed that the brightness of the optical film is severely degraded when the distances Px and Py between protrusions are less than 50 μm. On the contrary, it was revealed that the relative brightness values are 99% or more when the distances Px and Py between protrusions exceed 100 μm. This indicates that the substantial loss in brightness caused by the formation of protrusions is reduced to 0 by adjusting the distribution of the protrusions.

The present inventors have made continuous attempts, and found that there is no substantial loss in brightness of the optical film when the sum of areas where protrusions are formed accounts for 0.5 to 5% of the entire surface area of one surface of the optical film.

Therefore, for the optical film according to one exemplary embodiment of the present invention, the area where a plurality of the protrusions is formed is preferably in a range of 0.5 to 5% of the entire surface area of one surface of the optical film. When the area where the protrusions are formed exceeds 5%, the brightness of the optical film may be degraded, whereas the surface defects are slightly reduced when the area where the protrusions are formed is less than 0.5%. When the area where the protrusions are formed is within the range, the optical film according to one exemplary embodiment of the present invention has a substantially identical brightness, compared to the protrusion-free optical film.

Meanwhile, the protrusions are preferably formed through laser etching. In accordance with the present invention, the reasons for the use of laser beam to form the protrusions are described, as follows.

First, since the laser etching is a very precise process, the laser etching is suitable for forming a fine structure such as the protrusions according to one exemplary embodiment of the present invention. Also, the laser etching has an advantage in that, although any stereoscopic shapes such as the lens structure are present in a processed mold, secondary shapes having a constant depth from a curved surface may be provided with an etching surface since the laser beam reaches an etching surface and then begin to process the etching surface. Also, since a shape, an area and a depth of etching per pulse may be adjusted under the control of an optical system, it is possible to easily mark spots, and also to exactly form protrusions in a desired position. When the laser beam is used to form the protrusions as described above, it is possible to exactly control the position or height of the formed protrusions, unlike the conventional processes such as bead sanding. Therefore, the etching surface is simultaneously endowed with the regularity and irregularity by controlling the position or height of the protrusions. Therefore, it is possible to solve the problems such as the Moire and wet-out phenomena without any problems such as the loss in brightness that is caused when protrusions are randomly formed through the bead sanding.

For example, during the laser etching for forming protrusions in according to the present invention, the protrusions are formed with constant distances along a longitudinal direction of an optical film and an etching surface is endowed with irregularity by changing an initial phase of laser beam along a transverse direction of the optical film. Therefore, it is possible to suppress surface defects, such as the Moire and wet-out phenomena, which are caused by the regularity of a lens structure, without the loss in brightness.

Also, when a mold has no stereostructure such as a lens structure, shapes per pulse are not as much uniform as in the bite processing. Therefore, it is rather advantageous to suppress a Moire or wet-out phenomenon caused by the uniformity.

Meanwhile, the optical film according to one exemplary embodiment of the present invention may further comprise convex portions in addition to a plurality of the protrusions. The convex portions are formed to further improve optical performances of the optical film. Here, a width of each of the convex portions is preferably in a range of approximately 3 to 15 μm, and a height of each convex portion is preferably in a range of approximately 1 to 3 μm. When the width of each convex portion is less than 3 μm, the optical performance of the optical film is slightly improved, whereas the brightness of the optical film may be degraded when the width of each convex portion exceeds 15 μm. Also, when the height of each convex portion is less than 1 μm, the optical performance of the optical film is slightly improved, whereas the brightness of the optical film may be degraded when the height of each convex portion exceeds 10 μm.

Meanwhile, when a light exit portion of the optical film is composed of a lens structure, the convex portions are preferably formed on a valley region of the lens structure. When the convex portions are formed on the valley region of the lens structure, it is effective to prevent the Moire performance. One of major factors that cause a Moire phenomenon is the difference in transmission between a peak region and a valley region of the lens structure. In general, since the valley region of the lens structure is formed in the form of a cusp, the light incident towards the valley region has a higher reflection than the transmission of the incident light. As a result, the valley region of the lens structure has a relatively lower brightness than the crest region, which leads to the irregular striped stains caused by the Moire phenomenon. However, when lens-shaped convex portions are formed on the valley region of the lens structure according to the present invention, the transmission in the valley region is improved, thereby improving the Moire performance more effectively.

Figure 3:
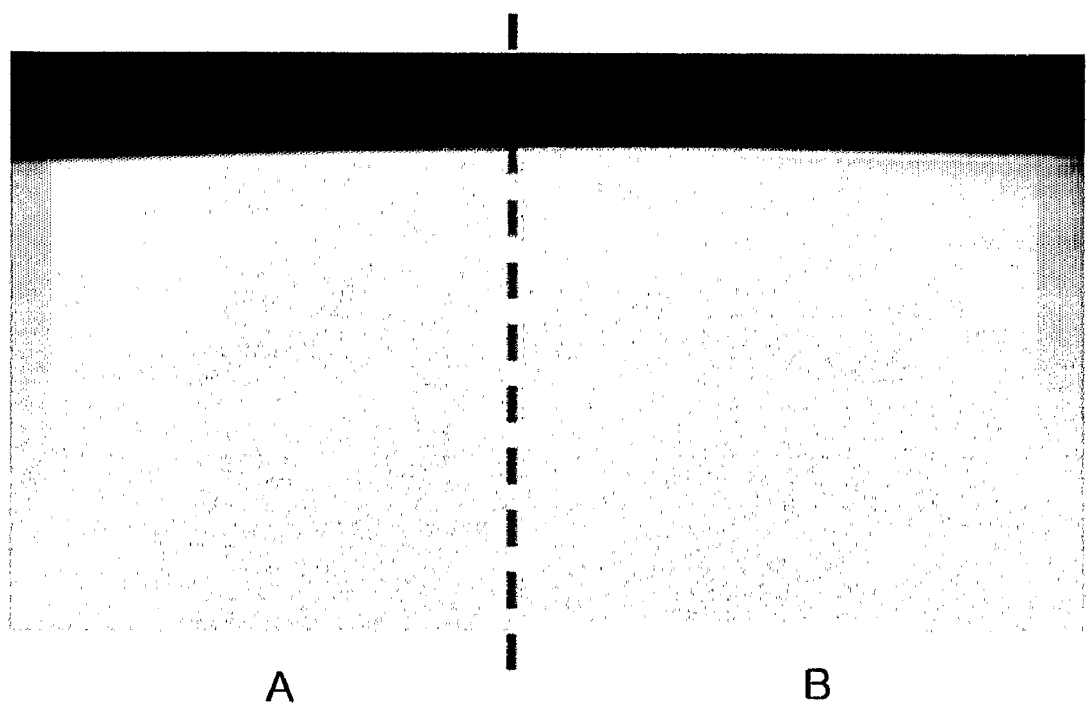
FIG. 3 is a diagram illustrating the effect of preventing the Moire performance when convex portions are formed on the optical film.

FIG. 3 shows photograph taken from a surface of a backlight unit (A) including a film having convex portions formed in the valley region of the lens structure, and a surface of a backlight unit (B) including a convex portion-free film.

As shown in FIG. 3, it might be revealed that light stripes are observed in the case of the convex portion-free film, but the film having convex portions has no stripe at all.

Figure 4:
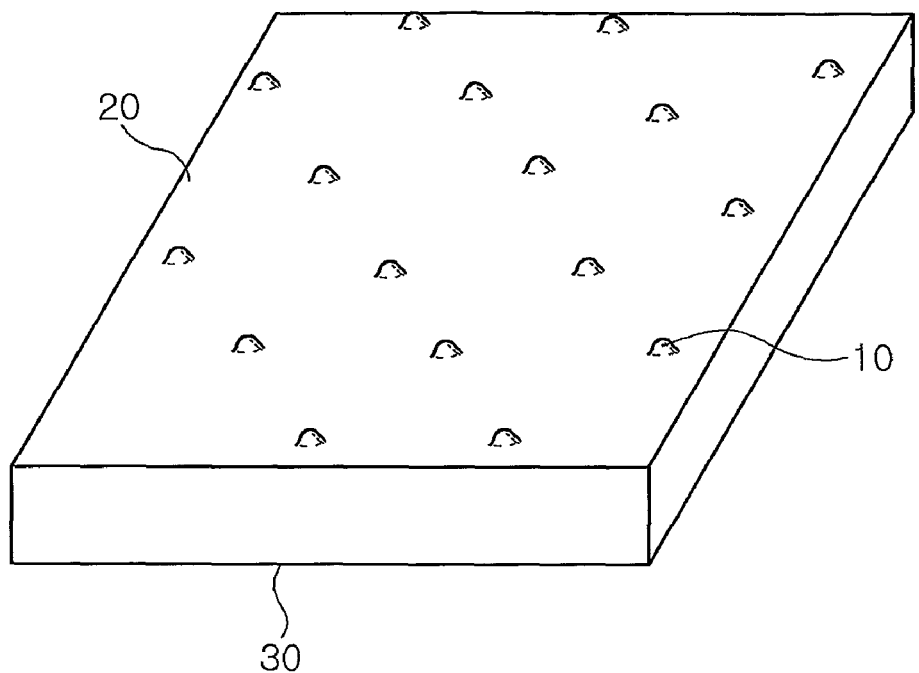
FIGS. 4 to 6 are diagrams illustrating optical films according to one exemplary embodiment of the present invention.
Figure 5:
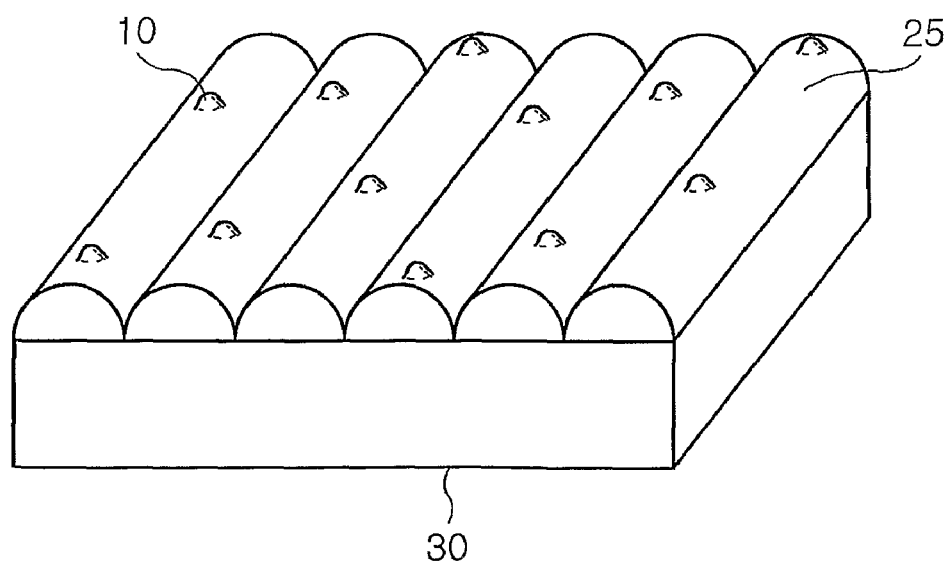
Figure 6:
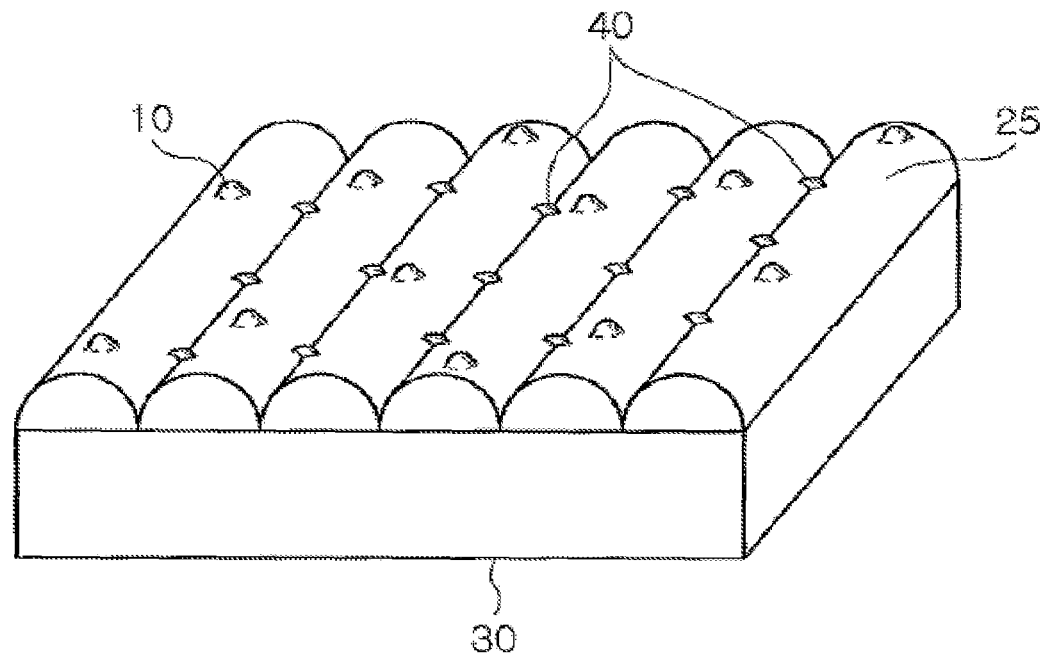

FIGS. 4 to 6 show optical films according to one exemplary embodiment of the present invention. Hereinafter, the optical films according to one exemplary embodiment of the present invention will be described in more detail with reference to FIGS. 4 to 6.

As shown in FIG. 4, the optical film according to one exemplary embodiment of the present invention includes a light-incident portion 30 and a light exit portion 20, both of which may have a flat surface. Here, a plurality of protrusions 10 are formed on at least one of the light-incident portion 30 and the light exit portion 20. In this case, a plurality of the protrusions 10 is formed so that they can satisfy the requirements of the Expressions 1 and 2.

When both of the light-incident portion 30 and the light exit portion 20 are flat, the surface defects, which are caused by the Moire, Newton ring and wet-out phenomena caused by the lens structure, do not occur, but the surface defects caused by the blocking between optical films occur. When the protrusions are formed on the light-incident portion and/or the light exit portion according to the present invention, the protrusions act as a spacer between optical films, thereby preventing the blocking between films. However, when the protrusions are formed too compactly, hazes are getting serious, and a light-collimating effect is degraded by the spreading effect observed in the protrusions. Also, when the distance between the protrusions is too wide, the blocking between films is poor. Therefore, in accordance with the present invention, it is possible to effectively prevent the blocking between films and suppress the loss in brightness and the increases in haze by controlling the height and distance of the protrusions to the ranges of the Expressions 1 and 2.

Meanwhile, the optical film according to one exemplary embodiment of the present invention may include a light exit portion 20 composed of a lens structure 25; and a flat light-incident portion 30, as shown in FIG. 5. In this case, a plurality of protrusions 10 is formed on the lens structure 25. In particular, a plurality of the protrusions 10 is preferably formed around the peak of the lens structure 20. Also, although not shown, a plurality of protrusions 10 may also be formed on the light-incident portion 30 of the optical film.

FIG. 5 shows that protrusions 10 are formed on respective lens structures 25, but the distribution of the protrusions may be varied according to the height of the formed protrusions, the desired optical performance and etc. Here, the protrusions should be formed so that they can satisfy the requirements of the Expressions 1 and 2, but it is not necessary to form protrusions on all the lens structures.

In accordance with the present invention, when the protrusions 10 are formed around the peak of the lens structure 25 and/or the light-incident portion 30, the protrusions act as a spacer, and have the effect of preventing the blocking between films and the surface defects caused by the wet-out or Newton ring phenomenon.

FIG. 5 shows that the lens structure 20 is a lenticular lens, but the present invention is not particularly limited thereto. Therefore, it is considered that the lens structure 20 comprises a variety of lens structures that are used in the art to collimate light, for example a prism, a lenticular lens, a micro lens array, a Fresnel lens, etc.

As shown in FIG. 6, the optical film according to one exemplary embodiment of the present invention may further comprise lens-shaped convex portions 40 in addition to the protrusions 10 formed on the lens structure 25. The convex portions 40 are preferably formed on the valley region of the lens structure. When the convex portions 40 are formed on the valley region of the lens structure 25, the convex portions 40 function to prevent the Moire phenomenon by reducing the transmission of light between the peak region and the valley region of the lens structure.

Next, the process for manufacturing an optical film will be described in more detail.

The optical film according to one exemplary embodiment of the present invention includes: etching shapes of protrusions in at least one of a first mold and a second mold by using a laser beam, the first mold engraved with a shape of a light-incident portion and the second mold engraved with a shape of a light exit portion; and injecting a curable resin between the first mold and the second mold and curing the curable resin. First, a first mold engraved with a shape of a light-incident portion and/or a second mold engraved with a shape of a light exit portion are prepared, respectively.

In this case, shapes of the light-incident portion and/or the light exit portion may be flat, or formed in the form of a lens structure. Molds having the shapes may be obtained by one on the conventional mold manufacturing methods widely known in the art, for example, mechanical cutting, photoresist reflow, bead coating, laser etching methods, etc.

Figure 7:
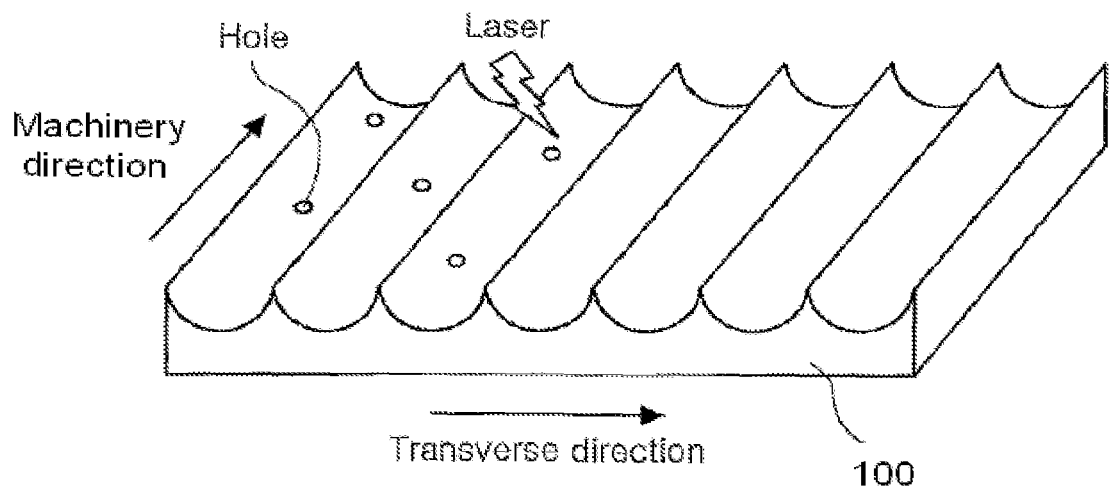
FIG. 7 is a diagram illustrating a method for manufacturing a mold according to one exemplary embodiment of the present invention.

In this case, the mold may be a flat-type mold, a caterpillar-type mold or a drum-type mold, and may be formed of hard materials including metals such as nickel and chromium and ceramic, or soft materials such as polymers, silica-coated polymer films. Next, shapes of the protrusions are etched by irradiating the first mold and/or the second mold 100 with a laser beam (see FIG. 7). For the present invention, the reasons for the use of laser beam to form the protrusions are described in the same manner as described above.

In this case, the protrusions are preferably formed so that they can satisfy the requirements of Expressions 1 and 2. That is, the protrusions are preferably formed so that they can satisfy the requirements of the following Expressions: $80 \times H^{1/3} \leq P \leq 200 \times H^{1/3}$ and $0.1 \times D \leq H \leq D$, provided that a mean diameter of protrusions is represented by 'D', a mean height of protrusions is represented by 'H', and a mean distance between adjacent protrusions is represented by 'P'.

Also, it is preferred to change an initial phase of a laser beam along a transverse direction of an optical film so as to form the protrusions. The optical defects caused by the regularity of the lens structure may be reduced without degrading the brightness of the optical film by changing the initial phase of the laser beam in a transverse direction of the optical film.

Meanwhile, the optical film according to one exemplary embodiment of the present invention may further comprise: engraving shapes of the convex portions prior to the formations of the protrusions. In this case, the operation of engraving shapes of the convex portions may be carried out through the same laser etching as in the formation of the protrusions, or carried out through the bead sanding.

When the convex portions are engraved through the laser etching, the Moire phenomenon may be improved by forming the convex portions on a valley region of the lens structure. Meanwhile, unlike the laser etching, the bead sanding has a problem in that it is impossible to control a position where the protrusions are formed. However, the bead sanding has the same effect as the laser etching since beads are mainly sanded on a convex region (i.e. a valley region of the lens structure in the optical film) of a mold rather than a concave region (i.e. a peak region of the lens structure in the optical film) of the mold due to the air turbulence during the bead sanding.

The shapes of the protrusions are etched onto the first mold and/or the second mold using the above-mentioned process and then an optical film is prepared by injecting a curable resin between the first mold and the second mold and curing the curable resin. The process for manufacturing an optical film using a mold has been widely known in the art, and thus a skilled-person in this art may be used to manufacture the optical film according to one exemplary embodiment of the present invention without any difficulties, with reference to the specification of the present invention or the prior art.

For example, the optical film according to one exemplary embodiment of the present invention may be manufactured by extruding a UV curable resin and the like into a film, forming a desired pattern in a light exit portion and a light-incident portion of an optical film by passing through the film between the first mold and the second mold, and curing the film having a pattern formed therein by exposing the film to ultraviolet rays.

In this case, the first mold and/or the second mold, having the protrusions etched by laser beam according to the present invention, may be used as the molds to manufacture the optical film according to one exemplary embodiment of the present invention.

MODE FOR THE INVENTION

Hereinafter, exemplary embodiments of the present invention are described in more detail.

The following Examples 1 and 2 and Comparative example 1 were conducted by stacking two lenticular lens sheets, which have been recently proven to be the most effectively used in televisions or other monitors, above and below. In this case, the elongation direction of lenticular lenses of the upper sheet is perpendicular to that of lenticular lenses of the lower sheet.

Example 1

As the two lenticular lens sheets, films, which include a flat light-incident portion and a light exit portion having a lenticular lens structure (pitch: 50 μm and height: 23 μm) formed therein, wherein protrusions having a diameter of 15 μm and a height of 5 μm are formed with a distance of 300 μm on a peak region of the lenticular lens structure, were used.

Example 2

As the lower lenticular lens sheet, a film, which include a flat light-incident portion and a light exit portion having a lenticular lens structure (pitch: 50 μm and height: 23 μm) formed therein, wherein protrusions are not formed on the lenticular lens structure, was used. As the upper lenticular lens sheet, a film, which include a flat light-incident portion and a light exit portion having a lenticular lens structure (pitch: 50 μm and height: 23 μm) formed therein, wherein protrusions having a diameter of 15 μm and a height of 5 μm are formed with a distance of 300 μm on a peak region of the lenticular lens structure, was used.

Comparative Example 1

As the two lenticular lens sheets, films, which include a flat light-incident portion and a light exit portion having a lenticular lens structure (pitch: 50 μm and height: 23 μm) formed therein, were used. Here, protrusions are not formed on the lenticular lens sheets.

The optical films of Examples 1 and 2 and Comparative example 1 were measured for brightness. Two lenticular lens sheets were put on a backlight diffuser plate, and the brightness of the lenticular lens sheets was measured using a brightness/optical distribution measurement machine (ELDIM), and re-measured and corrected using BM7 so as to measure the brightness of an optical film more exactly.

Figure 8:
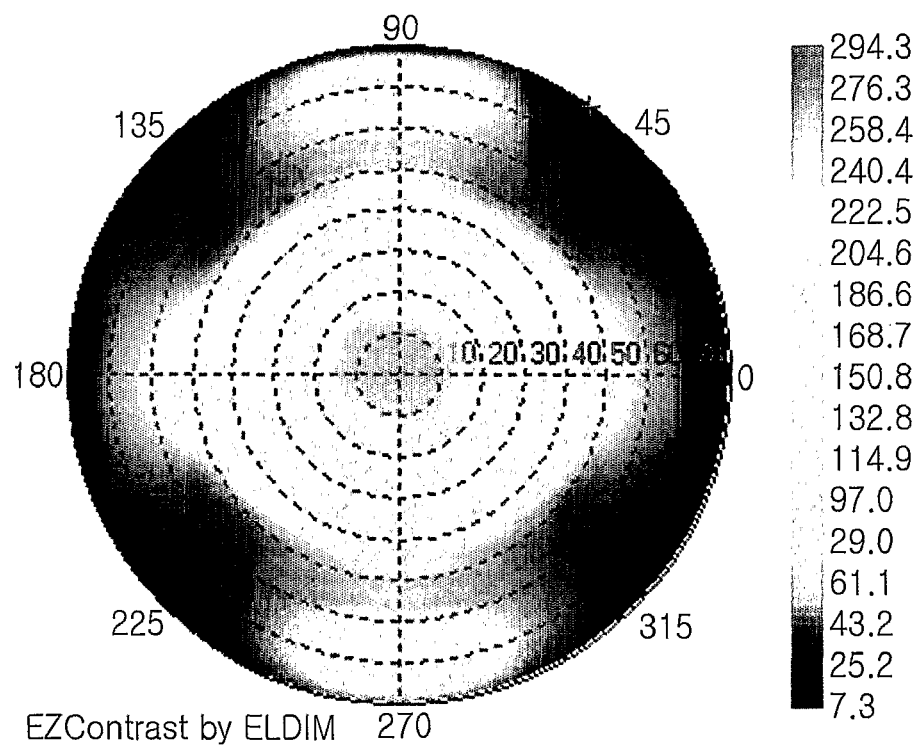
FIG. 8 is a diagram illustrating the brightness of an optical film described in Example 1.
Figure 9:
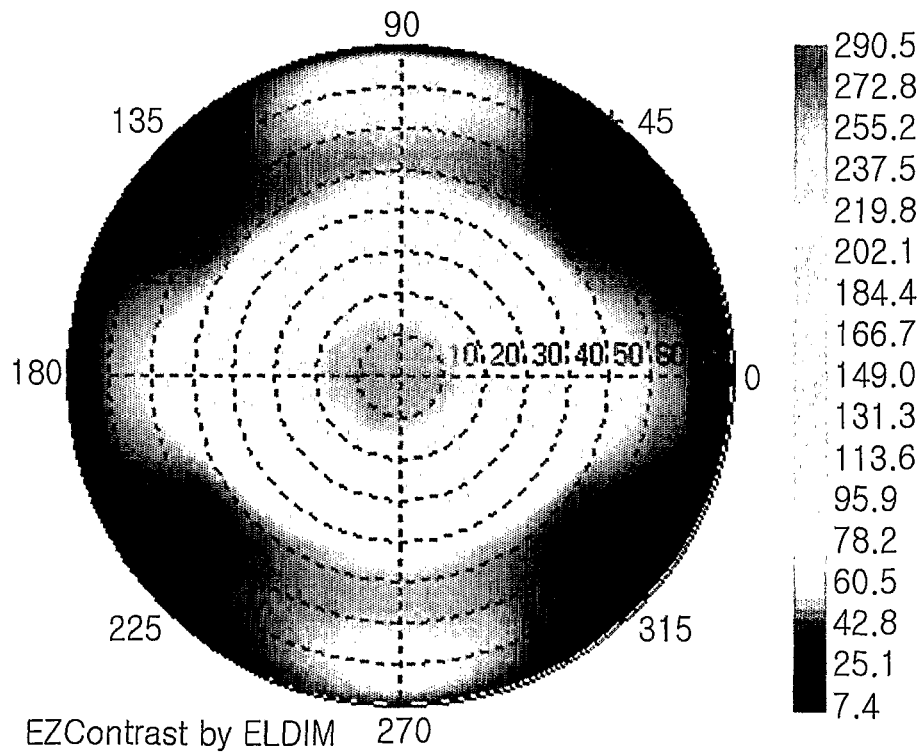
FIG. 9 is a diagram illustrating the brightness of an optical film of Example 2.
Figure 10:
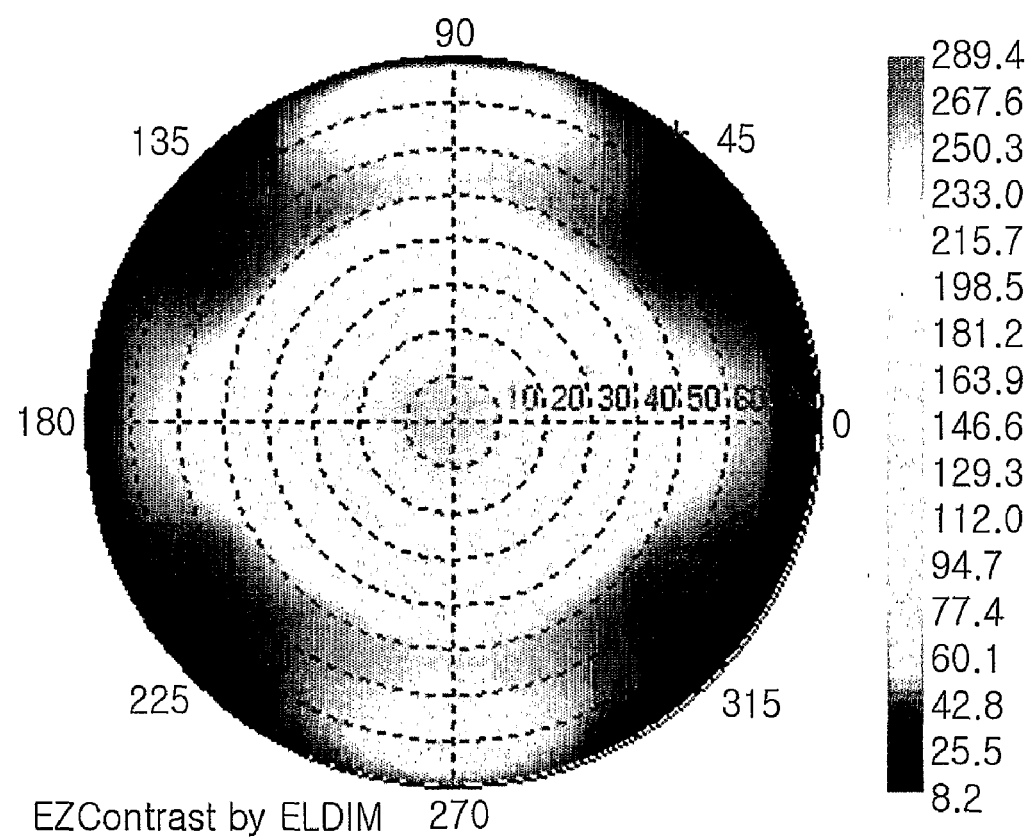
FIG. 10 is a diagram illustrating the brightness of an optical film of Comparative example 1.
Figure 11:
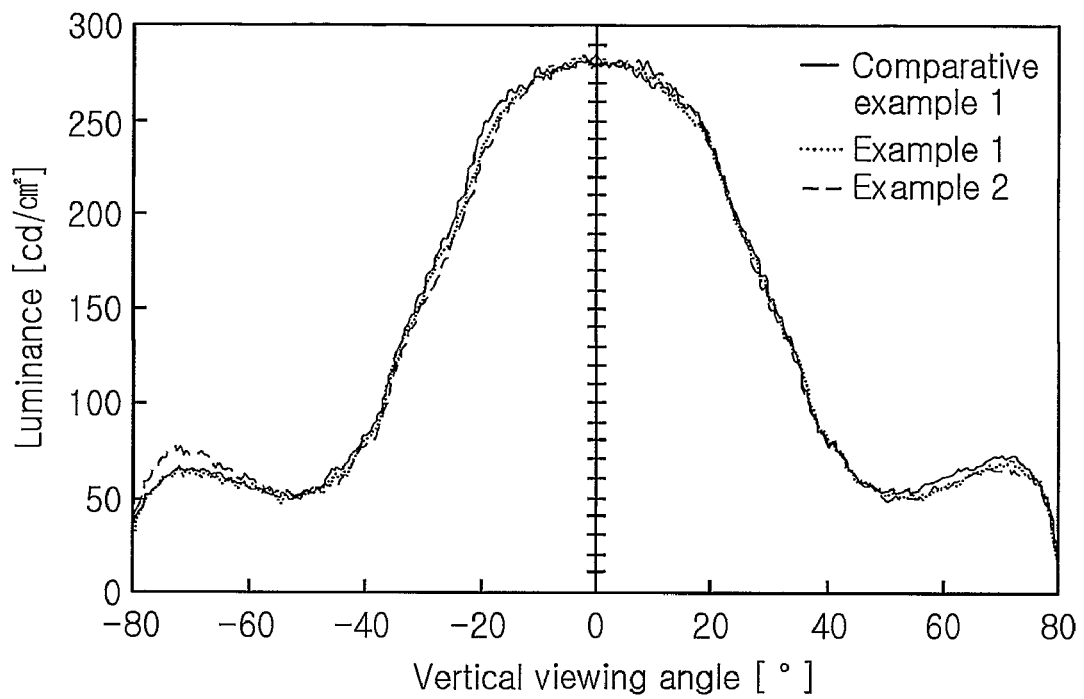
FIG. 11 is a graph illustrating the changes in brightness according to the vertical viewing angles of Examples 1 and 2 and Comparative example 1.
Figure 12:
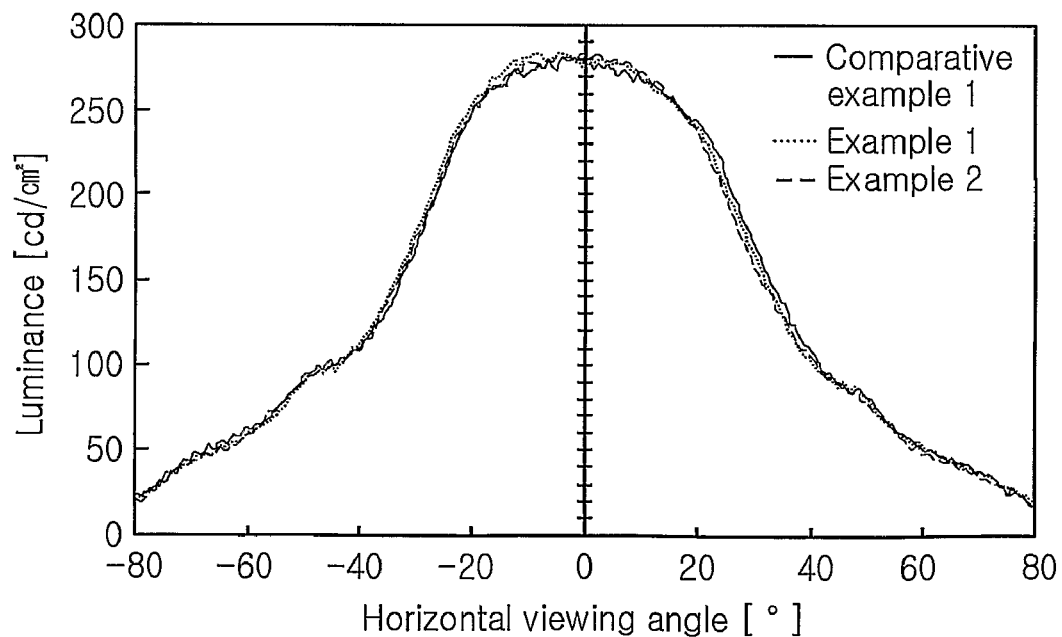
FIG. 12 is a graph illustrating the changes in brightness according to the horizontal viewing angles of Examples 1 and 2 and Comparative example 1.

The measurement results of the optical film of Example 1 are shown in FIG. 8, the measurement results of the optical film of Example 2 are shown in FIG. 9, and the measurement results of the optical film of Comparative example 1 are shown in FIG. 10. Also, the brightness values according to the vertical/horizontal viewing angles of the optical films of Examples 1 and 2 and Comparative examples are shown in FIGS. 11 and 12, respectively.

As shown in FIGS. 8 to 12, it was revealed that the optical films of Examples 1 and 2 have the substantially same brightness value as the optical film of Comparative example 1 in which protrusions are not formed, which indicates that the loss in brightness is not caused by the protrusions.

Example 3

A PET film was stacked on the optical film, which include a flat light-incident portion and a light exit portion having a lenticular lens structure (pitch: 50 μm and height: 23 μm) formed therein, wherein protrusions having a diameter of 15 μm and a height of 5 μm are formed with a distance of 300 μm on a peak region of the lenticular lens structure, and the resulting was kept at 80° C. for 48 hours under relative moisture of 95%, and then measured for the blocking between films, a wet-out phenomenon, a Newton ring phenomenon, and the presence of scratches.

Comparative Example 2

In comparison, a PET film was stacked on a brightness enhancement film (BEF, 3M) that has been most widely used in the art, and the resulting was kept at 80° C. for 48 hours under relative moisture of 95%, and then measured for the blocking between films, a wet-out phenomenon, a Newton ring phenomenon, and the presence of scratches.

The optical defects such as the Newton ring and wet-out phenomena and the blocking between films were observed with the naked eye in a distance of approximately 30 cm through the reflected light with illumination of 150 lumens (working environments in offices or laboratories).

Meanwhile, the presence of scratches was measured using a pencil hardness tester, and observed with the naked eye after the 2H test.

The measurement results are listed in the following Table 2, and FIG. 1 is a photograph illustrating the blocking between both of the film-laminates. Here, a left part of FIG. 1 shows film-laminate of Example 3 and a right part of FIG. 1 shows film-laminate of Comparative example 2.

TABLE 2

|  | Example 3 | Comparative example 2 |
|---|---|---|
| Newton ring | None | Detected |
| Wet-out | None | Detected |
| Blocking between films | None | Detected |
| Scratches (2H test) | None (Level 5H) | Detected (Level 1H) |

As listed in Table 2 and shown in FIG. 1, it was revealed that the optical film according to one exemplary embodiment of the present invention has the effect of preventing the blocking between films, compared to the conventional films, and also has the excellent effect of suppressing the formation of optical defects such as Moire, wet-out phenomena and Newton ring phenomena.

The invention claimed is:

1. An optical film having a light-incident portion and a light exit portion, comprising:
a plurality of lens structures formed on the light exit portion so as to collect or diffuse light; and
a plurality of protrusions formed on crest regions of the plurality of lens structures,
wherein the plurality of the protrusions satisfy the requirements of the following expressions: $80 \times H^{1/3} \leq P \leq 200 \times H^{1/3}$ and $0.1 \times D \leq H \leq D$, provided that a mean diameter of protrusions is represented by 'D', a mean height of protrusions is represented by 'H', and a mean distance between adjacent protrusions is represented by 'P', and
the plurality of protrusions are arranged to have uniform intervals therebetween along a lengthwise direction of the optical film and to have different initial positions thereof along a transverse direction of the optical film.

2. The optical film of claim 1, wherein each of the plurality of the protrusions has a height of 1 to 30 μm, and a mean distance between the adjacent protrusions is in a range of 100 to 600 μm.

3. The optical film of claim 1, wherein each of the plurality of the protrusions has a height of 4.5 to 7 μm, and a mean distance between the adjacent protrusions is in a range of 150 to 300 μm.

4. The optical film of claim 1, wherein a sum of areas where the plurality of the protrusions are formed accounts for 0.5% to 5% of an entire surface area of one surface of the optical film.

5. The optical film of claim 1, wherein the plurality of the protrusions are formed through laser etching.

6. The optical film of claim 1, further comprising a plurality of lens-shaped convex portions.

7. The optical film of claim 6, wherein the convex portions are formed by bead sanding or laser processing.

8. The optical film of claim 1, wherein the lens structures comprise a lenticular lens, a prism lens, a micro lens array or a Fresnel lens.

9. The optical film of claim 8, wherein the optical film further comprises a plurality of lens-shaped convex portions, wherein the convex portions are formed in valley regions of the lens structures.

10. A process for manufacturing an optical film having a light-incident portion and a light exit portion, comprising:
preparing a first mold engraved with a shape of the light-incident portion and a second mold engraved with shapes of lens structures of the light exit portion;
etching shapes of protrusions in the second mold by using a laser beam, the first mold engraved with a shape of a light-incident portion and the second mold engraved with shapes of lens structures of the light exit portion; and injecting a curable resin between the first mold and the second mold and curing the curable resin, wherein the shapes of the protrusions are formed on crest regions of the lens structures of the second mold and satisfy the requirements of the following expressions: $80 \times H^{1/3} \leq P \leq 200 \times H^{1/3}$ and $0.1 \times D \leq H \leq D$, provided that a mean diameter of the protrusions is represented by 'D', a mean height of the protrusions is represented by 'H', and a mean distance between adjacent protrusions is represented by 'P', and the etching of the shapes of the protrusions is performed while changing an initial phase of the laser beam along a transverse direction of the optical film such that the shapes of the protrusions are arranged to have uniform intervals therebetween along a lengthwise direction of the optical film and to have different initial positions thereof along the transverse direction of the optical film.

11. The process of claim 10, wherein the first mold and the second mold comprise a flat-type mold, a caterpillar-type mold or a drum-type mold.

12. The process of claim 10, further comprising: engraving the shapes of convex portions on valley regions of the lens structures prior to etching the shapes of protrusions in the second mold by using the laser beam.

13. The process of claim 12, wherein the engraving of the shapes of the convex portions is preformed by bead sanding or laser processing.

14. The process of claim 10, wherein the lens structures of the light exit portion have a shape of a lenticular lens, a prism, a micro lens array or a Fresnel lens.

* * * * *